US012413668B2

(12) United States Patent
Dizengof et al.

(10) Patent No.: US 12,413,668 B2
(45) Date of Patent: Sep. 9, 2025

(54) CELLULAR DEVICE CALLER ID AUTO-DISCOVERY

(71) Applicant: Carbyne Ltd., Tel-Aviv (IL)

(72) Inventors: Alexander Dizengof, Ashdod (IL); Ohad Rubinstein, Ness Ziona (IL)

(73) Assignee: Carbyne Ltd., Tel-Aviv (IL)

( * ) Notice: Subject to any disclaimer, the term of this patent is extended or adjusted under 35 U.S.C. 154(b) by 692 days.

(21) Appl. No.: 17/712,317

(22) Filed: Apr. 4, 2022

(65) Prior Publication Data
US 2023/0319181 A1   Oct. 5, 2023

(51) Int. Cl.
*H04M 3/42* (2006.01)
*H04W 4/14* (2009.01)
*H04W 8/18* (2009.01)

(52) U.S. Cl.
CPC ......... *H04M 3/42034* (2013.01); *H04W 4/14* (2013.01); *H04W 8/183* (2013.01)

(58) Field of Classification Search
None
See application file for complete search history.

(56) References Cited

U.S. PATENT DOCUMENTS

| 2006/0094354 A1* | 5/2006 | Munje | H04W 76/11 455/39 |
| 2011/0016516 A1* | 1/2011 | Mo | G06F 21/31 709/227 |

FOREIGN PATENT DOCUMENTS

| CA | 2769369 A1 * | 10/2012 | ............ H04W 8/265 |
| WO | WO-2019136463 A1 * | 7/2019 | .............. F41H 11/00 |
| WO | WO-2021162387 A1 * | 8/2021 | ........... H04B 1/3816 |

OTHER PUBLICATIONS

ETSI TS 103 625_ETSI TS 103 625 V1.1.1_pub.date_2019-12 (Year: 2019).*

* cited by examiner

Primary Examiner — Jinsong Hu
Assistant Examiner — Alexander J Yi (57) ABSTRACT

Disclosed herein are methods and systems for discovering an MSISDN of a cellular device, comprising detecting an activation event of the cellular device with a SIM associated with an MSISDN not exposed to the cellular device, transmitting one or more discovery Short Message Service (SMS) messages to a discovery system configured to transmit back to the cellular device one or more response SMS messages comprising the MSISDN identified for the discovery SMS message(s), receiving the response SMS message(s), and storing the MSISDN extracted from the response SMS message(s). The cellular device includes the stored MSISDN and a location of the cellular device in one or more Advanced Mobile Location (AML) messages transmitted by the cellular device to an AML service when initiating an emergency call.

11 Claims, 5 Drawing Sheets

CELLULAR DEVICE CALLER ID AUTO-DISCOVERY

FIELD AND BACKGROUND OF THE INVENTION

The present invention, in some embodiments thereof, relates to discovering Mobile Station International Subscriber Directory Numbers (MSISDN) of cellular devices, and, more specifically, but not exclusively, to auto-discovery of the MSISDNs by cellular devices which are not exposed to the MSISDN associated with their installed Subscriber Identity Modules (SIM).

Cellular devices in general and cellular phones in particular have become wide spread and are used by billions of people around the world.

In order to support and comply with legacy phone infrastructures, systems, networks and services, originally designed and deployed to support land lines, each of the cellular devices may be uniquely identified by a unique phone number, also known as caller identifier (ID), and more accurately an MSISDN which is the professional term used in the industry.

The MSISDNs may be primarily used to direct calls and/or messages (e.g. text messages) to/from their associated cellular devices. However, the MSISDNs may be further used to support additional functionality and services. For example, caller ID service, as known in the art, may be used to identify the origin of calls and/or messages, i.e., the originating phone and hence the caller associated with the originating phone.

Moreover, the MSISDNs may be used to identify cellular devices between services such that each cellular device may be deterministically identified across disparate services which may thus exchange with each other data relating to a certain cellular device identified by its unique MSISDN.

SUMMARY OF THE INVENTION

According to a first aspect of the present invention there is provided a method of discovering an MSISDN of a cellular device, comprising using one or more processors of a cellular device for:

Detecting an activation event of the cellular device with a SIM associated with an MSISDN not exposed to the cellular device.

Transmitting one or more discovery SMS messages to a discovery system configured to transmit one or more response SMS messages to the cellular device in response to receiving the one or more SMS messages. The one or more response SMS messages comprising the MSISDN identified for the one or more discovery SMS messages.

Receiving the one or more response SMS messages.

Storing the MSISDN extracted from the one or more response SMS messages.

Wherein the cellular device includes the stored MSISDN and a location of the cellular device in one or more Advanced Mobile Location (AML) messages transmitted by the cellular device to an AML service when initiating an emergency call.

According to a second aspect of the present invention there is provided a cellular device for discovering its MSISDN, comprising one or more processors configured to execute a code. The code comprising:

Code instructions to detect an activation event of the cellular device with a SIM associated with an MSISDN not exposed to the cellular device.

Code instructions to transmit one or more discovery SMS messages to discovery system configured to transmit one or more response SMS messages to the cellular device in response to receiving the one or more discovery SMS messages. The one or more response SMS messages comprising the MSISDN identified for the one or more discovery SMS messages.

Code instructions to receive the one or more response SMS messages.

Code instructions to store the MSISDN extracted from the one or more response SMS messages;

Wherein the cellular device includes the stored MSISDN and a location of the cellular device in one or more AML messages transmitted by the cellular device to an AML service when initiating an emergency call.

According to a third aspect of the present invention there is provided a method of discovering MSISDNs of cellular devices, comprising using one or more processors of a discovery system for:

Receiving one or more discovery SMS messages from one or more cellular devices. The one or more cellular devices transmit the one or more discovery SMS messages in response to detecting an activation event of the respective cellular device with a SIM associated with an MSISDN not exposed to the respective cellular device.

Transmitting one or more response SMS messages to the one or more cellular devices. The one or more response SMS messages comprising the MSISDN identified for the one or more discovery SMS messages.

Wherein the one or more cellular devices are configured to store the MSISDN extracted from the one or more response SMS messages. The one or more cellular devices include the stored MSISDN and a location of the respective cellular device in one or more AML messages transmitted by the one or more cellular devices to an AML service when initiating an emergency call.

According to a fourth aspect of the present invention there is provided a discovery system for discovering MSISDNs of cellular devices, comprising one or more processor configured to execute a code. The code comprising:

Code instructions to receive one or more discovery short message service (SMS) message from one or more cellular devices. The one or more cellular devices transmit the one or more discovery SMS messages in response to detecting an activation event of the respective cellular device with a SIM associated with an MSISDN not exposed to the respective cellular device.

Code instructions to transmit one or more response SMS messages to the one or more cellular devices. The one or more response SMS messages comprising the MSISDN identified for the one or more discovery SMS messages.

Wherein the one or more cellular devices are configured to store the MSISDN extracted from the one or more response SMS massages. The one or more cellular devices include the stored MSISDN and a location of the respective cellular device in one or more AML messages transmitted by the one or more cellular devices to an AML service when initiating an emergency call.

According to a fifth aspect of the present invention there is provided a method of AML messages received from cellular devices with MSISDNs of the cellular devices, comprising using one or more processors of a discovery system for:

Receiving one or more discovery SMS messages from one or more cellular devices. The one or more cellular devices transmit the one or more discovery SMS messages in response to detecting an activation event of the respective cellular device with a SIM associated with an MSISDN not exposed to the respective cellular device. The one or more discovery SMS messages comprise one or more IDs uniquely identifying the respective cellular device installed with the SIM.

Identifying the MSISDN for the one or more discovery SMS messages.

Extracting the one or more IDs from the one or more discovery SMS messages.

Storing the one or more IDs and the MSISDN associated together.

Associating one or more AML messages transmitted by the one or more cellular devices with the MSISDNs associated with the one or more IDs extracted from the one or more AML messages. The one or more cellular devices transmit the one or more AML messages to an AML service when initiating an emergency call.

According to a sixth aspect of the present invention there is provided a discovery system for associating AML messages received from cellular devices with MSISDN of the cellular devices, comprising one or more processors configured to execute a code. The code comprising:

Code instructions to receive one or more discovery SMS messages from one or more cellular devices. The one or more cellular devices transmit the one or more discovery SMS messages in response to detecting an activation event of the respective cellular device with a SIM associated with an MSISDN not exposed to the respective cellular device. The one or more discovery SMS messages comprises one or more IDs uniquely identifying the respective cellular device installed with the SIM.

Code instructions to identify the MSISDN for the one or more discovery SMS messages.

Code instructions to extract the one or more IDs from the one or more discovery SMS messages.

Code instructions to store the one or more IDs and the MSISDN associated together.

Code instructions to associate one or more AML messages transmitted by the one or more cellular devices with the MSISDN associated with the one or more IDs extracted from the one or more AML messages. The one or more cellular devices transmit the one or more AML messages to an AML service when initiating an emergency call.

In a further implementation form of the first, second, third, fourth, fifth and/or sixth aspects, the cellular device is a member of a group consisting of: a cellular phone, a wearable device, and/or a carry-able device.

In a further implementation form of the first, second, third, fourth, fifth and/or sixth aspects, the activation event is a member of a group consisting of: an initial activation of the cellular device, an initial activation of a new SIM installed in the cellular device, a replacement of the SIM, a periodic MSISDN discovery process scheduled for the cellular device, and an instruction transmitted to the cellular device to initiate an MSISDN discovery process.

In a further implementation form of the first, second, third, fourth, fifth and/or sixth aspects, the SIM is a member of a group consisting of: a SIM card and an embedded-SIM (eSIM).

In a further implementation form of the first, second, third, fourth, fifth and/or sixth aspects, the one or more discovery SMS messages are members of a group consisting of: a data SMS and/or a binary SMS.

In a further implementation form of the first, second, third and/or fourth aspects, the one or more response SMS messages are members of a group consisting of: a data SMS and/or a binary SMS.

In a further implementation form of the first, second, third, fourth, fifth and/or sixth aspects, the MSISDN of the cellular device is identified for the one or more discovery SMS messages based on a caller identifier (ID) service.

In a further implementation form of the first, second, third, fourth, fifth and/or sixth aspects, the MSISDN of the cellular device is identified for the one or more discovery SMS messages based on one or more IDs uniquely identifying the cellular device installed with the SIM.

In a further implementation form of the first, second, third, fourth, fifth and/or sixth aspects, the one or more IDs are members of a group consisting of: an international mobile equipment identity (IMEI) of the one or more cellular devices, an international mobile subscriber identity (IMSI) of the SIM, and/or an integrated circuit card identifier (ICCID) of the SIM.

In a further implementation form of the first, second, third, fourth, fifth and/or sixth aspects, the discovery system is integrated with an AML system executing the AML service.

In a further implementation form of the first, second, third, fourth, fifth and/or sixth aspects, the one or more AML messages are transmitted via one or more of: an SMS message, and/or a Hypertext Transfer Protocol Secure (HTTPS) based message.

In a further implementation form of the first, second, third, fourth, fifth and/or sixth aspects, one or more Public Safety Answering Points (PSAP) receiving the emergency call are configured to communicate with the AML service to obtain the location of the cellular device associated with the MSISDN identified for the emergency call by the one or more PSAPs.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to discovering MSISDNs of cellular devices, and, more specifically, but not exclusively, to auto-discovery of the MSISDNs by cellular devices which are not exposed to the MSISDN associated with their installed SIMS.

As known in the art, cellular devices, for example, cellular phones, wearable devices, carry-able devices and/or the like having cellular network connectivity may be uniquely identified in the cellular network through unique phone numbers, designated Mobile Station International Subscriber Directory Numbers (MSISDN), and sometimes referred to as caller IDs or phone numbers.

The MSISDN, assigned to each cellular device by one or more service providers operating the cellular networks and providing the cellular devices network connectivity to the cellular network(s), may be used to direct traffic to and/or from the cellular devices, for example, calls, text messages such as, for example, Short Message Service (SMS) messages and/or the like.

Moreover, the MSISDNs (also known as caller IDs or phone numbers) of the cellular devices and of telephones in general is used to identify calls and/or data (messages) originating from the cellular devices and received by different services and/or via different communication channels.

For example, one or more mobile devices may initiate emergency calls to one or more Public Safety Answering Services (PSAP) and may simultaneously transmit one or more Advanced Cellular Location (AML) messages to one or more AML services deployed to collect location data (e.g., geolocation, address, coordinates, etc.) of cellular devices. The AML messages comprising the location and MSISDN of the sending (originating) cellular devices may comprise, for example, SMS messages, Hyper Text Transport protocol (HTTP) messages, HTTP Secure (HTTPS) messages and/or the like. The receiving PSAP(s) may therefore communicate with the AML service(s) to obtain increased precision location data of the cellular devices from which the incoming emergency call originate. In such cases, the PSAP(s) and the AML service(s) may correlate between the incoming emergency calls and the AML messages according to the MSISDN of the originating cellular devices.

The MSISDN of each cellular device 202 is controlled by the cellular network which is configured to uniquely and deterministically associate each MSISDN with a respective SIM installed in one of the cellular device, for example, with an International Cellular Subscriber Identity (IMSI) number hardcoded in each SIM.

Based on the association between the MSISDNs allocated to the cellular devices and the IMSI numbers of the SIMs installed in the cellular devices, the cellular network may therefore direct cellular traffic destined to each MSISDN to the respective cellular device installed with the SIM associated with the respective MSISDN.

This means that in contrast to the IMSI, the MSISDN assigned to each cellular device is not hardcoded in the SIM. In some cases, cellular devices may be exposed to their MSISDNs assigned to them in the cellular network meaning that such cellular devices are familiar with (know) their cellular IDs.

However, in some scenarios and use cases, one or more of the cellular devices may not be exposed to their MSISDNs. For example, cellular devices installed with prepaid SIMs which are not attached to an ongoing cellular contract, plan and/or subscription is typically not be exposed to their MSISDNs, meaning that such cellular devices may not know and be unfamiliar with their MSISDNs.

According to some embodiments of the present invention, there are provided methods, systems, devices and computer program products for discovering MSISDNs of cellular devices.

One or more cellular devices, specifically cellular devices which are not exposed to and thus unfamiliar with the MSISDNs associated with (allocated to) their installed SIMs, may initiate an (auto) discovery process to discover the MSISDN associated with their installed SIM.

Each cellular device may typically initiate the MSISDN discovery process once detecting an activation event of the cellular device with a SIM, for example, an initial activation of the cellular device (i.e., a first time setup), detection of a new SIM installed in the cellular device, a SIM replacement and/or the like. However, one or more cellular devices may initiate the discovery process periodically and/or on-demand (per instruction) to identify, check and/or confirm their assigned MSISDN, i.e., the MSISDN associated with their installed SIM.

During the MSISDN discovery process, the cellular device may transmit one or more discovery messages, for example, a discovery SMS messages to a discovery system configured to identify the MSISDN of the received discovery SMS message which is the MSISDN associated with the SIM installed in the originating cellular device.

The discovery system may apply one or more methods as known in the art, to discover the MSISDN for the incoming discovery SMS message(s), for example, using caller ID service, querying the cellular service provider serving the cellular device, and/or the like.

The discovery system may then transmit back to the cellular device one or more response messages, for example, a response SMS message comprising the identified MSISDN which, as described herein before, is the MSISDN associated with the SIM and thus the MSISDN allocated to the cellular device.

The cellular device may extract its MSISDN from the response SMS message(s) and may store it locally for future (later) use to support one or more applications, services, and/or the like, for example, Advanced Cellular Location (AML), specifically for AML used to complement reporting of emergency events to one or more PSAPs as known in the art.

It may be essential for the cellular devices to discover and learn their assigned MSISDNs in order to support PSAP related AML services since the AML services and PSAPs exchanging with each data relating to a plurality of cellular devices may correlate and identify each of these cellular devices according to their assigned MSISDNs.

When detecting an outgoing emergency call to one or more of the PSAPs (e.g. 911, in the US, 211 in Europe, etc.), one or more of the cellular devices transmit one or more AML messages to one or more AML services. The AML message(s) may include at least the MSISDN of the respective cellular device and its location, for example, geolocation, address, coordinates and/or the like.

The PSAP receiving the emergency call from the cellular device may identify the MSISDN of the cellular device and may communicate with the AML service to obtain the location of the cellular device associated with the MSISDN detected for the emergency call. The AML service may analyze the AML messages and extract the location of the cellular device from the AML message(s) comprising the MSISDN indicated by the PSAP and may respond to the PSAP with the location of the cellular device. This means that using the MSISDNs, the emergency call and the AML messages may be associated with the same cellular device which initiated the emergency call.

According to some embodiments of the present invention, rather than storing (saving) the discovered MSISDN of the cellular devices locally at the cellular devices, the MSISDN discovered for one or more of the cellular devices may be stored by the discovery system. As such, the discovery system may support AML services, for example, to provide AML data to PSAP(s) even for cellular devices that are not familiar with their MSISDNs.

In such embodiments, one or more of the cellular devices not exposed to their assigned MSISDNs may transmit one or more discovery SMS messages to the discovery system as described herein before. However, the AML message(s) transmitted by each such cellular device may further comprise one or more IDs which uniquely and deterministically identify the respective cellular device, for example, the IMSI of its installed SIM, an International Mobile Equipment Identity (IMEI) of the cellular device, an Integrated Circuit Card Identifier (ICCID) of the installed SIM, and/or the like.

The discovery system may identify the MSISDN for the received discovery message(s) originating from each such cellular device. The discovery system may further store the MSISDN, specifically, the discovery system may store the MSISDN in association with the ID(s) extracted from the AML message(s) such that the ID(s) of the cellular device are mapped in the discovery system to the MSISDN assigned to the cellular device and vice versa, the MSISDN is mapped to the ID(s).

When an emergency call is initiated from one or more of these cellular devices, the respective cellular device may transmit, to the AML service, one or more AML messages comprising the location of the respective cellular device and one or more of the cellular device's ID(s).

The discovery system, which may be optionally integrated with the AML service, may associate the ID(s) extracted from the AML message(s) with the MSISDN stored in the discovery system in association with the extracted ID(s) and may respond to one or more AML queries received from one or more of the PSAPs with the location of the cellular device(s) whose MSISDN is indicated by the PSP in the AML query(s).

Discovering the MSISDNs of cellular devices which are not exposed to their assigned MSISDNs may present major advantages and benefits.

Cellular devices which are not exposed to their assigned MSISDNs, for example, cellular devices installed with prepaid SIMs may be unable or at least highly limited in their capacity to support services relying on the MSISDN to identify the cellular devices, for example, the AML services deployed to support the PSPs. For example, in South America, there are some countries where as much as 30% of the cellular subscribers use prepaid SIMs which may be considerably cheap compared to standard cellular subscription plans and contacts.

This means that PSAPs receiving emergency calls reported by users using such cellular devices may be unable to obtain accurate location data relating to the reporting users. This is because even if such cellular devices may be configured to transmit AML messages to the AML service, the AML service may be unable to correlate the received AML messages with the MSISDN of the transmitting cellular device(s). The AML service be therefore unable to respond to the PSAP AML queries indicting the MSISDNs of the originating cellular devices from which the emergency calls originate.

Discovering the MSISDNs of such cellular devices which are initially no exposes to and hence unfamiliar with their MSISDNs, may therefore significantly increase efficiency and/or coverage (e.g. global worldwide coverage) of MSISDN based services, for example, AML services deployed to support PSAPs. Providing the PSAPs with accurate location data of the cellular devices reporting the emergency events may significantly increase the efficiency of the PSAPs in responding and handling the emergency events as well as significantly reduce the response time of the field emergency teams dispatched to handle the emergency events. Such expedited response may be often highly crucial as an immediate response may reduce damage, and/or injury and in many cases may save lives.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
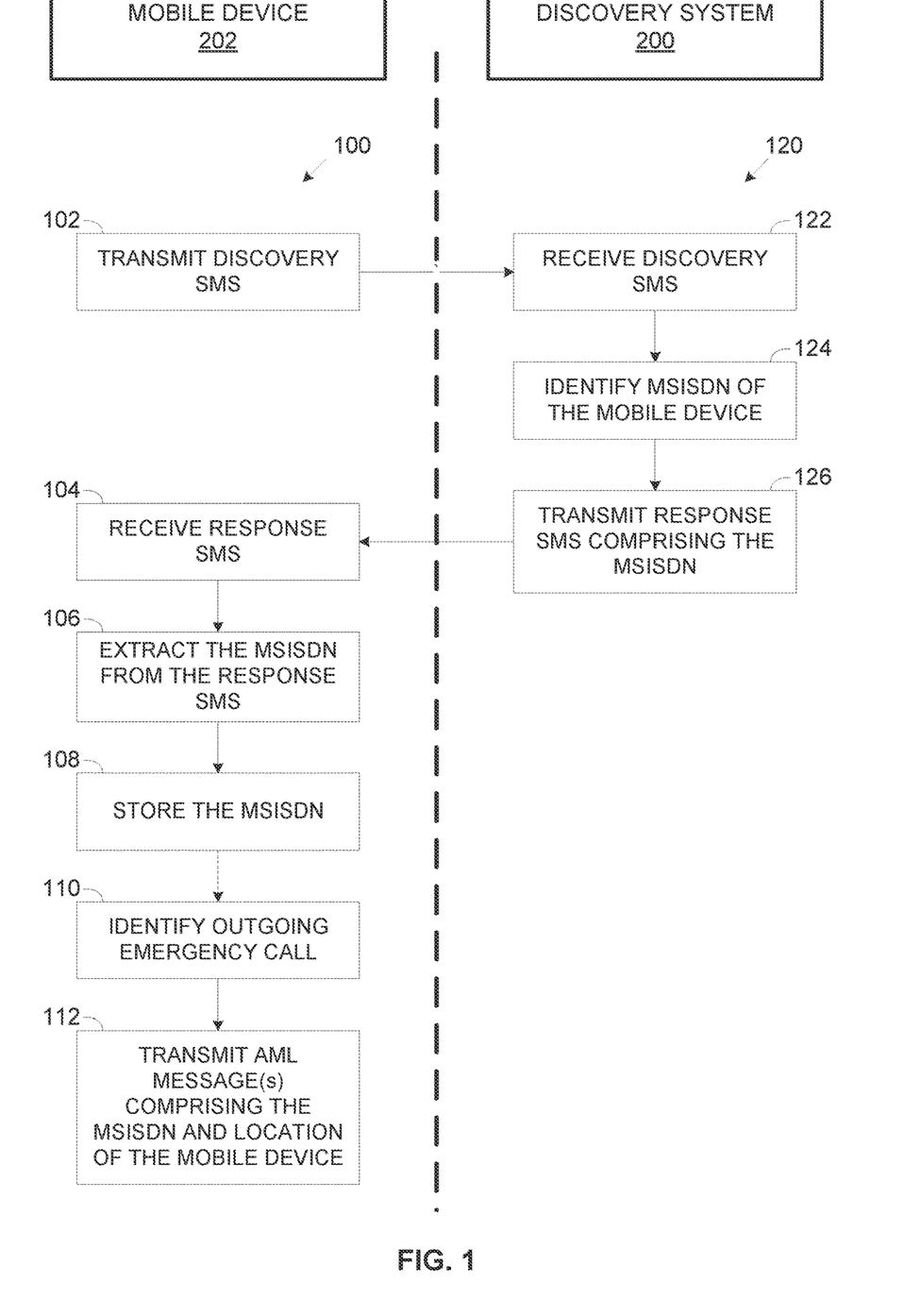
FIG. 1 presents flowcharts of exemplary processes executed by a cellular device not exposed to an MSISDN associated with its SIM and a discovery system to discover the MSISDN, according to some embodiments of the present invention.

Referring now to the drawings, FIG. 1 presents exemplary processes executed by a cellular device not exposed to an MSISDN associated with its SIM and a discovery system to discover the MSISDN, according to some embodiments of the present invention.

An exemplary process 100 may be executed by each of one or more cellular devices 202 to discover its unique MSISDN number (interchangeably designated caller ID) associated with a SIM installed in the respective cellular device 202.

In particular, the MSISDN associated with the SIM installed in the cellular device 202 may not be exposed to the cellular device 202 such that cellular device 202 may be unaware and/or unfamiliar with its MSISDN, i.e., the MSISDN allocated for its installed SIM. The cellular devices may use their discovered MSISDN to support services which rely on the MSISDNs for correlating data originating from cellular devices 202 and received by different service and/or via different communication channels.

An exemplary process 120 may be executed by a discovery system 200 deployed to support one or more cellular devices 202 to discover their respective unique MSISDNs by communicating with each cellular device to inform it of its informing MSISDN.

Figure 2A:
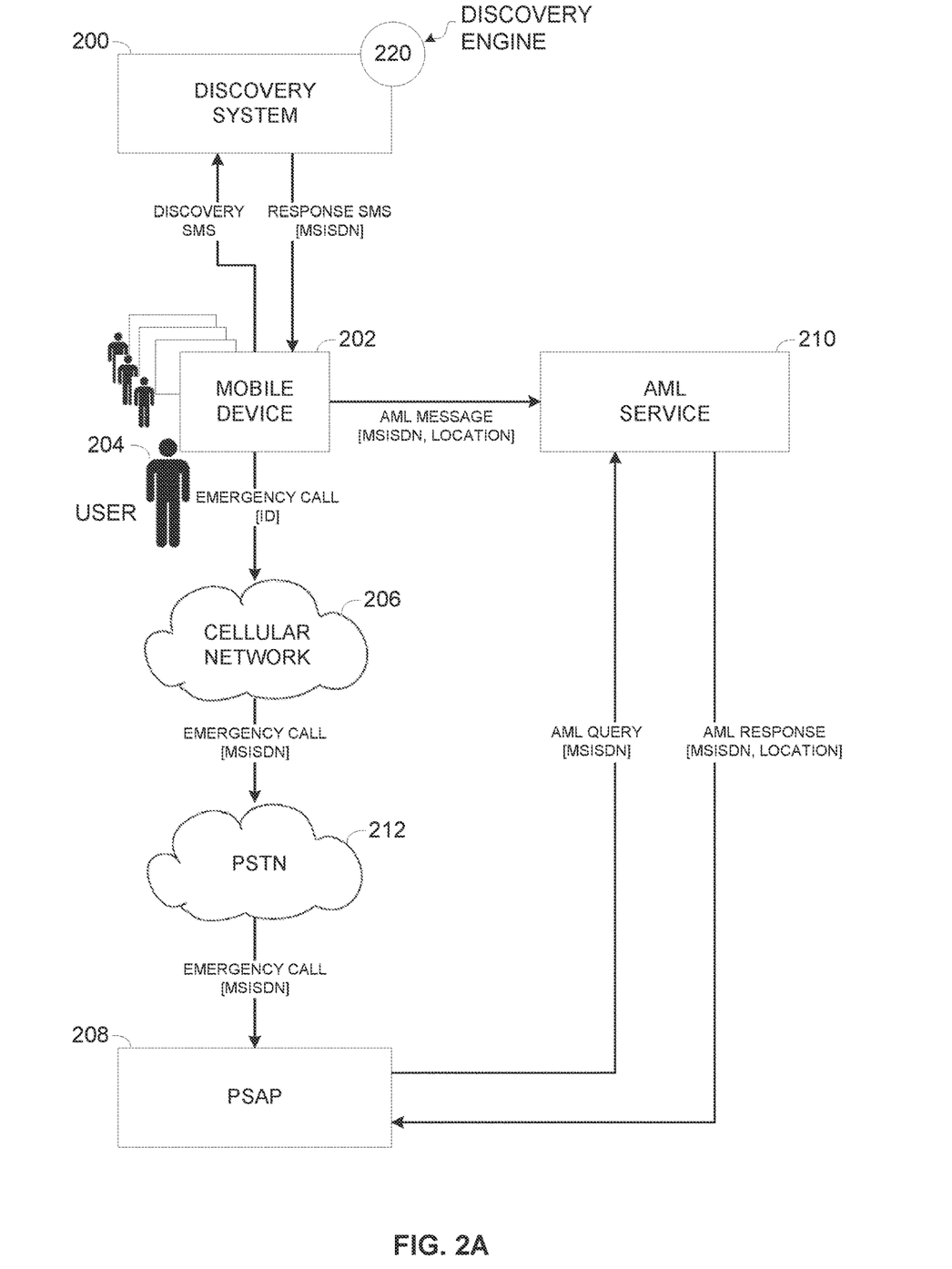
FIG. 2A and FIG. 2B are schematic illustrations of an exemplary system for discovering an MSISDN associated with a SIM installed in a cellular device where the cellular device is not exposed to the MSISDN, according to some embodiments of the present invention.
Figure 2B:
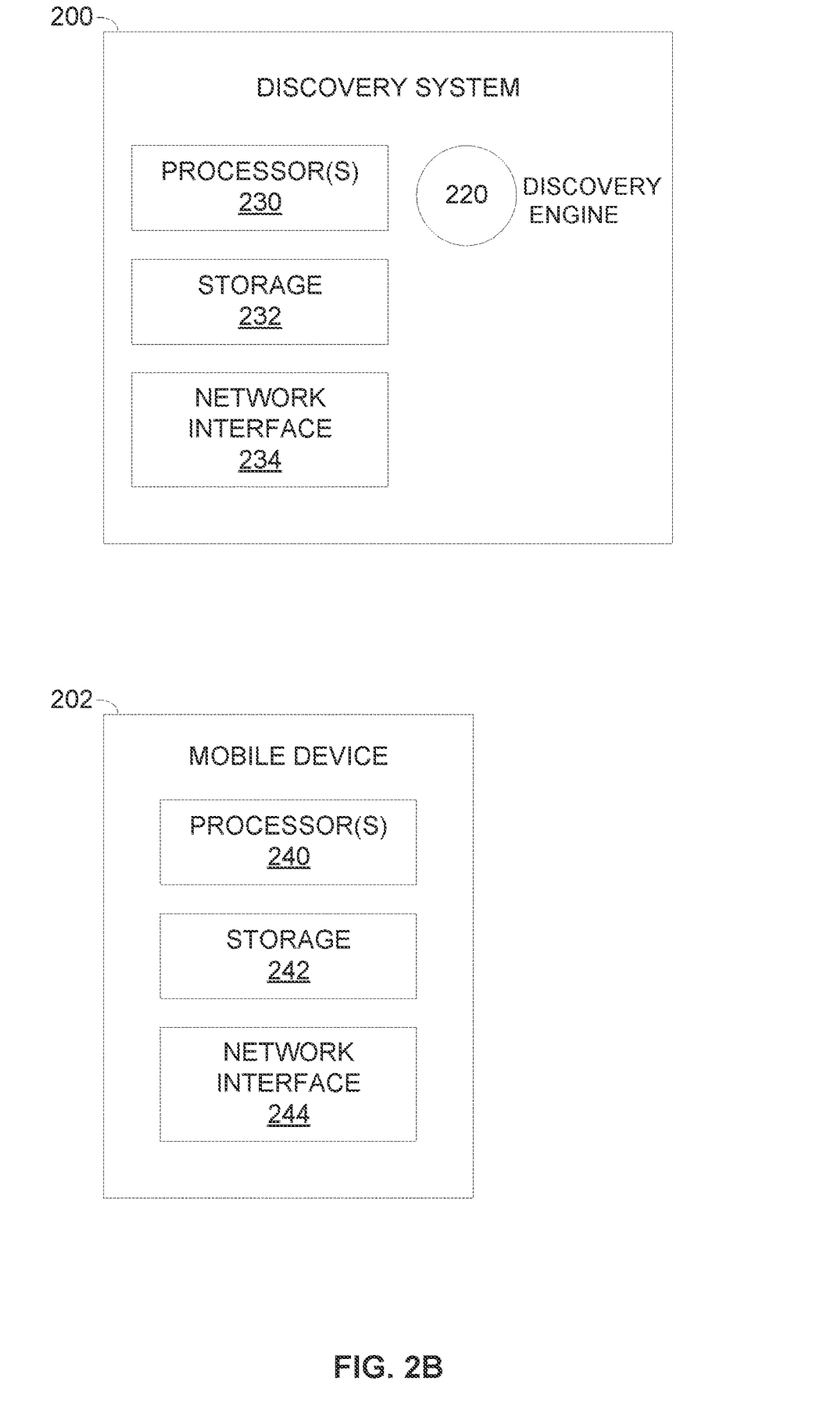

Reference is also made to FIG. 2A and FIG. 2B, which are schematic illustrations of an exemplary system for discovering a MSISDN associated with a SIM installed in a cellular device where the cellular device is not exposed to the MSISDN, according to some embodiments of the present invention.

As seen in FIG. 2A, an exemplary discovery system 200 may be deployed to support one or more cellular devices 202 associated with respective users 204, for example, a cellular phone, a wearable device, a carry-able device and/or the like to discover their unique MSISDNs associated with the SIMs installed in the cellular devices 202.

The cellular devices 202 supporting cellular network connectivity may be each installed with one or more SIMs, for example, a SIM card, an embedded-SIM (eSIM) and/or the like to support cellular connectivity to a cellular network 206 comprising one or more cellular networks operated by one or more cellular service provider(s). The cellular network 206 may further connect to one or more wired and/or wireless networks, for example, a Local Area Network (LAN), a Wide Area Network (WAN), a Metropolitan Area Network (MAN), the internet and/or the like such that one or more of the cellular devices 202 may further communicate with one or more networked resources connected to these networks.

Each of the cellular devices 202 may be uniquely identified by its unique MSISDN assigned to it by one or more cellular service providers providing the cellular device 202 with cellular connectivity to the cellular network 206.

However, the MSISDN (caller ID) allocated to each cellular device 202 is not hardcoded in the SIM installed in the cellular device 202 but is rather stored and controlled by the cellular network 206, i.e., the equipment, system, infrastructure and/or the like deployed to operate the cellular network 206.

Since calls and/or messages are routed to and/or from each cellular device 202 according to its MSISDN, the cellular network 206 may correlate a unique International Cellular Subscriber Identity (IMSI) number hardcoded in each SIM installed in each cellular device 202 with the MSISDN allocated to the respective cellular device 202.

Typically, the cellular devices 202 may be exposed to and familiar with (know) their MSISDNs allocated to them by their cellular service provider(s). However, in some scenarios and use cases, one or more of the cellular devices 202 may not be exposed to their MSISDNs. For example, in case one or more of the cellular devices 202 are installed with prepaid SIMs which are not attached to cellular contracts and/or plans, the service provider(s) issuing the SIMs may not expose the MSISDN to the cellular device(s) 202 installed with these prepaid SIMs.

In such case, one or more cellular devices 202 which are not exposed and unfamiliar with their MSISDNs may execute the process 100 to (auto) discover their MSISDNs.

After discovering their MSISDNs, one or more of the cellular devices 202 may use their discovered MSISDNs for one or more applications and uses, for example, AML to support, as known in the art, one or more PSAPs 208 configured to receive, handle and/or respond to emergency calls received from one or more of the cellular devices 202.

To support such AML applications, each of the cellular device 202 may be configured to report its location to one or more AML services, systems, applications and/or the like collectively designated AML service 210 hereinafter when detecting that an emergency call is initiated by the associated user 204 to one or more of the PSAPs 208 using the respective cellular device 202.

The emergency calls initiated by one or more of the cellular devices 202 may be routed from the cellular devices 202 to the PSAPs 208 through the cellular network 206 and further via one or more Public Switched Telephone Networks (PSTN) 212 connecting the PSAPs 208, specifically legacy PSAPs 208 to the telephony system.

Upon detection of the emergency call, for example, 911 in the US, 112 in Europe and/or the like, initiated from it, the cellular device 202 may automatically transmit one or more AML messages to the AML service 210. The AML message (s) may comprising at least location data relating to the respective cellular device 202, for example, a geolocation, coordinates, a location relative to one or more reference locations, and/or the like.

The cellular devices 202 may transmit the AML message (s) using one or more protocols and/or communication channels. For example, the AML messages transmitted by the cellular device 202 may include one or more SMS messages transmitted via one or more SMS services, cellular networks, PSTNs and/or the like. In another example, the cellular device 202 may transmit the AML message(s) via one or more networks, for example, LAN, WAN, MAN, cellular network 206, the internet and/or the like using one or more data transfer protocols, for example, HTTP, specifically HTTPS and/or the like.

The PSAP 208 receiving an emergency call from one or more of the cellular device 202 may communicate with the AML service 210 via one or more networks, for example, LAN, WAN, MAN, cellular network 206, the internet and/or the like to obtain the location (data) of the respective cellular device 202.

In order for the PSAP(s) 208 and the AML service 210 to identify each of the cellular devices 202 and effectively associate each cellular device 202 with its location data, each cellular device 202 must be uniquely identified. Specifically, as known in the art for AML, each cellular device 202 may be uniquely identified by its MSISDN, i.e., the MSISDN associated with its installed SIM. This is because the emergency calls originating from the cellular devices 202 may be directed to the PSAPs 208 via the PSTN 212 which operates based on phone numbers identified for the calls, i.e., the MSISDN associated with the cellular devices 202.

Each AML message transmitted by each cellular device 202 may therefore further comprise the MSISDN uniquely assigned to the respective cellular device 202, i.e., the MSISDN associated with the SIM installed in the respective cellular device 202.

When receiving an emergency call from one of the cellular devices 202, the PSAP 208 may transmit (issue) one or more AML queries to the AML service 210 with the MSISDN of the respective cellular device 202 identified by the PSTN 212 for the incoming emergency call. In response, the AML service 210 may transmit to the PSAP 208 one or more AML response messages comprising at least the location data extracted from the AML message(s) received from the cellular device 202 associated with the MSISDN indicated in the AML query(s).

As evident, each cellular device 202 configured to support AML must be familiar with its allocated MSISDN, i.e., the MSISDN associated with its installed SIM. Therefore, in case the respective cellular device 202 is not familiar with its MSISDN, in order to support AML, the respective cellular device 202 may execute the process 100 to discover and learn its MSISDN.

As seen in FIG. 2B, the discovery system 200, for example, a server, a computing node, a cluster of computing nodes and/or the like may include a processor(s) 230, a storage 232 for storing data and/or code (program store) and a network interface 234.

Via the network interface 234, the discovery system 200 may communicate with one or more of the cellular devices 202, the AML service 210, the PSAP 208, and/or one or more other network resources via one or more networks, for example, the cellular network 206, the PSTN 212, an SMS network, and/or one or more other wired and/or wireless networks such as, for example, a LAN, a WAN, a MAN, the internet and/or the like.

The processor(s) 230, homogenous or heterogeneous, may include one or more processing nodes arranged for parallel processing, as clusters and/or as one or more multi core processor(s). The storage 232 may include one or more non-transitory memory devices, either persistent non-volatile devices, for example, a ROM, a Flash array, a hard drive, an SSD, a magnetic disk and/or the like as well as one or more volatile devices, for example, a RAM device, a cache memory and/or the like. The storage 232 may further comprise one or more local and/or remote network storage resources, for example, a storage server, a Network Attached Storage (NAS), a network drive, a cloud storage service and/or the like accessible via the network interface 234.

The processor(s) 230 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 232 and executed by one or more processors such as the processor(s) 230.

Optionally, the processor(s) 230 includes, utilizes and/or applies one or more hardware elements available in the discovery system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 230 may therefore execute one or more functional modules utilized by one or more software modules, one or more of the hardware modules and/or a combination thereof. For example, the processor(s) 230 may execute a discovery engine 220 configured to execute the process 120.

Optionally, the discovery system 200 and/or the discovery engine 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

Optionally, the discovery system 200 may be integrated with the AML service 210 such that the discovery engine 220 may be executed by one or more of the servers and/or computing nodes hosting (executing) the AML service 210.

Each of the cellular devices 202, for example, a cellular phone, a wearable device, a carry-able device and/or the like may include a processor(s) 240 such as the processor(s) 230, a storage 242 for storing data and/or code (program store) and a network interface 244.

Via its network interface 244 comprising one or more network adaptors and/or interfaces, each cellular device 202 may connect to the cellular network 206 and may further connect through the cellular network 206 to one or more other networks, for example, the PSTN 212, the internet, a LAN, a WAN, a MAN and/or the like. One or more of the cellular devices 202 may therefore communicate, via their respective network interfaces 244, with one or more network resources connected to these networks, for example, the PSAP(s) 208, the AML service 210, the discovery system 200 and/or the like.

As described for the processor(s) 230, the processor(s) 240 may execute one or more software modules each comprising a plurality of program instructions stored in a non-transitory medium (program store) such as the storage 242 and executed by one or more processors such as the processor(s) 240. Optionally, the processor(s) 250 includes, utilizes and/or applies one or more hardware elements available in one or more of the cellular devices 202, for example, a circuit, a component, an IC, an ASIC, an FPGA, a DSP, a GPU and/or the like.

The processor(s) 240 may therefore execute one or more functional modules utilized by one or more software modules, one or more of the hardware modules and/or a combination thereof. For example, the processor(s) 240 may execute one or more functional modules to execute the process 100 for auto discovering their MSISDNs. However, while each cellular device 202 may employ one or more functional modules to execute the process 100, for brevity, the process 100 is described as executed by the cellular device 202 itself.

For brevity, the processes 100 and 130 are presented and described for discovering the MSISDN of a single cellular device 202. This, however, should not be construed as limiting since, as apparent to a person skilled in the art, a plurality of cellular devices 202 may each execute a process such as the process 100 and one or more discovery systems 200 may be deployed to execute a plurality of process such as the process 130 to support the plurality of cellular devices 202 to discover their respective MSISDNs.

As described herein before, the process 100 may be executed by each of one or more cellular devices 202 which are not exposed and hence unfamiliar with the MSISDNs allocated to them by their cellular service provider(s), specifically the MSISDN associated with the SIM installed in them. For example, the SIM installed in the cellular device 202 may be a prepaid SIM which is not attached to an ongoing cellular contract and/or plan. In such case, the cellular service provider may not expose (inform) the MSISDN associated with the prepaid SIM to the cellular device 202. One or more such cellular devices 202 may therefore execute the process 100 to (auto) discover its allocated MSISDN, i.e. the MSISDN associated with its installed SIM.

As shown at 102, the process 100 starts with the cellular device 202 transmitting one or more discovery SMS messages to the discovery system 200, for example, a data SMS, a binary SMS and/or the like.

In particular, the cellular device 202 may initiate the process 100 and transmit the discovery SMS message(s) when detecting an activation event of the cellular device 202 with a SIM that is associated with an MSISDN that is not available to the cellular device 202, i.e., the MSISDN is not exposed to the cellular device 202.

The activation event may be a one-time event. For example, the cellular device 202 may detect an initial activation of the cellular device 202 when first activated after production and may regard this initial activation as an activation event. In another example, the cellular device 202 may determine an activation event when detecting an initial activation of a new SIM installed in the cellular device 202. In another example, the cellular device 202 may detect a replacement of the SIM installed in it where the installed SIM may be a SIM previously installed in the cellular device 202.

However, the cellular device 202 may detect one or more additional activation events which may trigger initiation of the process 100 by the cellular device 202. For example, the activation event may be a periodic activation event defined to trigger a periodic MSISDN discovery process by the cellular device 202 every predefined time period, for example, a day, a week, a month and/or the like. In another example, the activation event be initiated on-demand by instruction(s) to the cellular device 202 to initiate the process 100 to discover its assigned MSISDN, i.e., the MSISDN associated with its installed SIM.

As shown at 122, the process 120 executed by the discovery system 200, specifically by the discovery engine 220, is started by the discovery engine 220 receiving the discovery SMS message(s) transmitted by the cellular device 202.

As shown at 124, the discovery engine 220 may identify the MSISDN for the incoming discovery SMS message(s), i.e., the MSISDN assigned to the cellular device 202, and more specifically the MSISDN associated by the cellular service provider with the SIM installed in the cellular device 202. For brevity, the MSISDN may be referred to hereinafter as the MSISDN of the cellular device 202.

The discovery engine 220 may use one or more techniques, methods and/or services to identify the MSISDN of the cellular device 202.

For example, the discovery engine 220 may identify the MSISDN of the cellular device based on caller ID service configured, as known in the art, to inform the receiving party, i.e., the discovery engine 220, the MSISDN (caller ID, phone number) of the device from which the discovery SMS message(s) originate, i.e., the cellular device 202. The caller ID service may be operated, provided and/or deployed by one or more phone networks, services, infrastructure equipment and/or their like, for example, the cellular network 206, the PSTN 212, etc. and/or a combination thereof.

In another example, the discovery engine 220 may identify the MSISDN of the originating cellular device 202 based on one or more IDs extracted from the SMS message(s) which uniquely and deterministically identify the cellular device 202 installed with the SIM. The ID(s) uniquely identifying the cellular device 202 and/or its installed SIM may be associated with the MSISDN of the cellular device 202 by one or more services, systems, platforms, operators, service providers and/or the like (collectively designated service providers), for example, the cellular network 206, the service provider of the cellular network and/or the like which may hold one or more records associating the MSISDN of one or more of the cellular devices 202 with their respective ID(s).

The ID(s) uniquely identifying the cellular device 202 and/or its installed SIM may include, for example, an International Mobile Equipment Identity (IMEI) of the cellular device 202 which is uniquely assigned to the cellular device and hardcoded in the cellular device 202. In another example, the ID(s) included in the discovery SMS message(s) may include an International Mobile Subscriber Identity (IMSI) of the SIM installed in the cellular device 202. In another example, the ID(s) included in the discovery SMS message(s) may include an Integrated Circuit Card Identifier (ICCID) of the SIM installed in the cellular device 202.

In such embodiments, the discovery engine 220 may therefore extract one or more of the IDs included in the discovery SMS message(s) by the cellular device 202 and may access the service provider(s) to obtain the MSISDN associated with the extracted ID(s).

As shown at 126, the discovery system 200, specifically by the discovery engine 220, may transmit back to the cellular device 202 one or more response SMS messages, for example, a data SMS, a binary SMS and/or the like.

The response SMS message(s) may comprise the MSISDN identified by the discovery engine 220 for the incoming discovery SMS message(s) received from the cellular device 202, i.e., the MSISDN of the cellular device 202, specifically the MSISDN associated with the SIM installed in the cellular device 202.

As shown at 104, the cellular device 202 may receive the response SMS message(s) from the discovery system 200.

As shown at 106, the cellular device 202 may extract the MSISDN from the response SMS message(s) from the discovery system 200.

As such, the MSISDN allocated for the cellular device 202, i.e., the MSISDN associated with the SIM installed in the cellular device 202 is now exposed to the cellular devices 202, meaning the cellular device 202 is now familiar with its MSISDN.

As shown at 108, the cellular device 202 may locally store its MSISDN, for example, in its storage 242 for future use to support one or more applications, services, goals and/or use cases.

For example, the cellular device 202 may use its stored MSISDN to support AML services, in particular an AML service such as the AML service 210 deployed to support one or more PSAPs such as the PSAP 208 and provide the PSAP 210 location data received from one or more of the cellular devices 202.

In particular, when receiving an emergency initiated by the cellular device 202 used and/or associated with the user 204, the PSAP 208 may communicate with the AML service 210 to obtain the location (data), for example, geolocation, coordinates, address and/or the like of the cellular device 202 which may typically be also the location of the user 204.

As shown at 110, which may take place after the cellular device 202 completes the MSISDN discovery process, the cellular device 202 may identify one or more emergency calls initiated by the cellular device 202 to one or more PSAPs 208, for example, a 911 call in the US, a 112 call in Europe and/or the like.

As shown at 112, when one or more of the emergency calls is initiated using the cellular device 202, the cellular device 202 may transmit one or more AML messages to the AML service 210. The AML message(s) may comprise at least the location (data) of the cellular device 202 and the MSISDN of the cellular device 202.

The cellular devices 202 may transmit the AML message(s) using one or more protocols and/or communication channels, for example, one or more SMS messages transmitted via one or more SMS services, cellular networks, PSTNs and/or the like, one or more HTTP messages, specifically HTTPS messages transmitted via one or more of the wired and/or wireless networks, for example, LAN, WAN, MAN, cellular network 206, the internet and/or the like.

The location (data) of the cellular device 202 may be obtained from one or more sensors, applications and/or services. For example, the cellular device 202, for example, a cellular smart watch may collect the location data from one or more location sensors of the cellular device 202, for example, a Global Poisoning Sensor (GPS), an Inertial Measurement Unit (IMU) and/or the like. In another example, the cellular device 202, for example, a cellular phone may collect the location data from a navigation application executed by the cellular device 202. In another example, the cellular device 202 may obtain the location data from one or more devices, for example, a watch, a wearable device and/or the like communicatively coupled to the cellular device 202 via one or more communication channels, for example, Bluetooth, Wi-Fi and/or the like.

The PSAP 208 receiving the emergency call(s) initiated by the cellular device 202 may identify the MSISDN for the incoming emergency call(s) using one or more methods as known in the art and may communicate with the AML service 210 to obtain the location (data) of the cellular device 202.

In particular, as known in the art, the PSAP 208 may issue one or more AML queries with the MSISDN of the cellular device 202 from which the emergency call(s) originates. In response to the AML query(s), the AML service 210 may transmit back to the PSAP 208 one or more AML response messages which include the location (data) of the cellular device extracted from the AML message(s) received by the AML service 210 from the cellular device 202.

Specifically, the AML service 210 may identify the cellular device 202 which the PSAP 208 refers to according to the MSISDN included in the AML query(s) and may transmit back to the PSAP 208 AML response message(s) comprising the location of the cellular device 202 associated with the MSISDN of the cellular device 202. Using the MSISDN, the PSAP 208 may therefore associate the incoming emergency call(s) originating from the cellular device 202 with the location of the cellular device 202 reported and received from the AML service 210.

Naturally, the PSAP 208 may receive a plurality of emergency calls from a plurality of cellular devices 202 and may thus use the MSISDNs of the originating cellular devices 202 to query the AML service 210 and correlate (associate) between the incoming emergency calls and the location of their originating cellular devices 202.

According to some embodiments of the present invention, rather than storing (saving) the discovered MSISDN of the cellular devices 202 locally at the cellular devices 202, the MSISDN discovered for one or more of the cellular devices 202 may be stored by a discovery system such as the discovery system 200.

Figure 3:
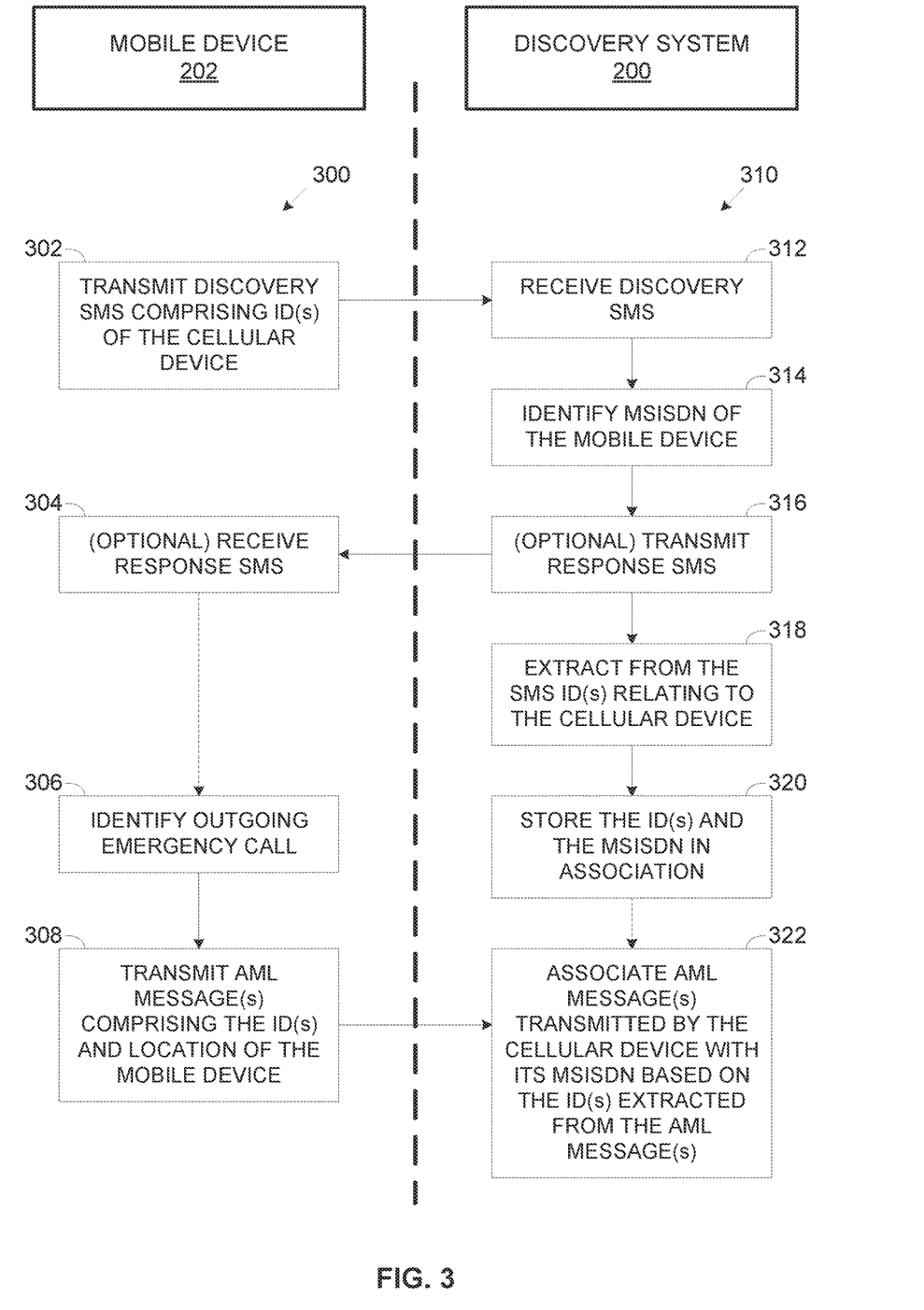
FIG. 3 presents flowcharts of second exemplary processes executed by a cellular device not exposed to an MSISDN associated with its SIM and a discovery system to discover the MSISDN, according to some embodiments of the present invention.

Reference is now made to FIG. 3, which presents flowcharts of second exemplary processes executed by a cellular device not exposed to an MSISDN associated with its SIM and a discovery system to discover the MSISDN, according to some embodiments of the present invention.

Figure 4:
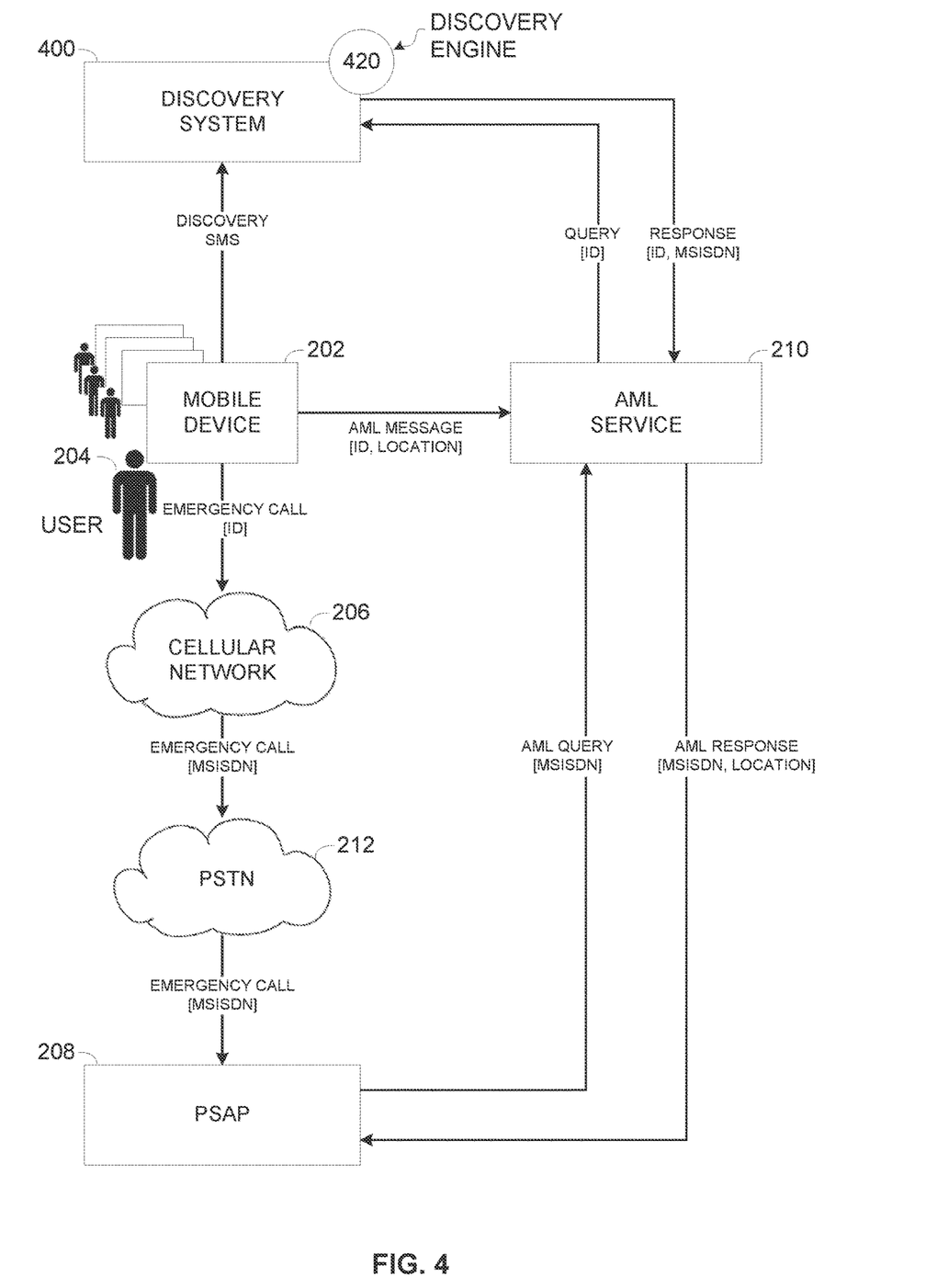
FIG. 4 is a schematic illustration of a second exemplary system for discovering an MSISDN associated with a SIM installed in a cellular device where the cellular device is not exposed to the MSISDN, according to some embodiments of the present invention.

Reference is also made to FIG. 4, which is a schematic illustration of a second exemplary system for discovering an MSISDN associated with a SIM installed in a cellular device where the cellular device is not exposed to the MSISDN, according to some embodiments of the present invention.

One or more cellular devices such as the cellular device 202 may each execute an exemplary process 300 in conjunction with an exemplary discovery system 400 executing an exemplary process 310 to discover the MSISDN of the respective cellular devices 202.

The discovery system 400, for example, a server, a computing node, a cluster of computing nodes and/or the like, which may be similar to the discovery system 200, may include a processor(s) such as the processor(s) 230, a storage such as the storage 232 for storing data and/or code (program store) and a network interface such as the network interface 234.

Via its network interface, the discovery system 400 may communicate with one or more of the cellular devices 202, an AML service such as the AML service 210 and/or one or more other network resources via one or more networks such as the cellular network 206, the PSTN 212, one or more wired and/or wireless networks, for example, a LAN, a WAN, a MAN, the internet and/or the like.

The processor(s) of the discovery system 400 may execute one or more software modules, for example, a process, a script, an application, an agent, a utility, a tool, an OS, a service, a plug-in, an add-on and/or the like each comprising a plurality of program instructions stored in a non-transitory medium (program store) such as the storage of the discovery system 400 and executed by one or more processors such as the processor(s) of the discovery system 400. Optionally, the processor(s) of the discovery system 400 may include, utilizes and/or applies one or more hardware elements available in the discovery system 400, for example, a circuit, a component, an IC, an ASIC, an FPGA, a DSP, a GPU and/or the like.

The processor(s) of the discovery system 400 may therefore execute one or more functional modules utilized by one or more software modules, one or more of the hardware modules and/or a combination thereof, for example, a discovery engine 420 configured to execute the process 310.

Optionally, the discovery system 400 and/or the discovery engine 420 may be utilized by one or more cloud computing services, platforms and/or infrastructures such as, for example, IaaS, PaaS, SaaS and/or the like provided by one or more vendors, for example, Google Cloud, Microsoft Azure, AWS and EC2, IBM Cloud, and/or the like.

Optionally, the discovery system 400 may be integrated with the AML service 210 such that the discovery engine 420 may be executed by one or more of the servers and/or computing nodes hosting (executing) the AML service 210.

As described for the processes 100 and 120, for brevity, the processes 300 and 310 are described herein after for discovering the MSISDN of a single cellular device 202. This, however, should not be construed as limiting since a plurality of cellular devices 202 may each execute a process such as the process 300 and one or more discovery systems 400 may be deployed to execute a plurality of process such as the process 310 to discover the MSISDNs of the plurality of cellular devices 202.

Similar to the process 100, the process 300 may be executed by each of one or more cellular devices 202 which are not exposed to the MSISDNs associated with their installed SIMs.

As shown at 302, the process 300 starts with the cellular device 202 transmitting one or more discovery SMS messages to the discovery system 400 as described in step 102 of the process 100.

In particular, the cellular device 202 may initiate the process 300 when detecting an activation event of the cellular device 202 with a SIM associated with an MSISDN not exposed and hence not available to the cellular device 202. The activation event may be a one-time event, a periodic event and/or initiated on-demand as describe in step 102 of the process 100.

The discovery SMS message(s) may comprise one or more IDs which uniquely and deterministically identify the cellular device 202 installed with its SIM, i.e., one or more unique IDs of the cellular device 202 and/or of the SIM. The ID(s) uniquely identifying the cellular device 202 and/or its installed SIM may include, for example, the IMEI of the cellular device 202, the IMSI of the SIM installed in the cellular device 202, the ICCID of the installed SIM and/or the like.

As shown at 312, the process 310 executed by the discovery system 400, specifically by the discovery engine 420, is started by the discovery engine 420 receiving the discovery SMS message(s) transmitted by the cellular device 202.

As shown at 314, the discovery engine 220 may identify the MSISDN for the incoming discovery SMS message(s), i.e., the MSISDN associate with the SIM installed in the cellular device 202 and hence assigned to the cellular device 202.

The discovery engine 220 may identify the MSISDN of the cellular device 202 as described in step 124 of the process 120.

As shown at 316, which is an optional step, the discovery system 400, specifically by the discovery engine 420, may optionally transmit back to the cellular device 202 one or more response SMS messages, for example, a data SMS, a binary SMS and/or the like.

However, the response SMS message(s) are not essential and may be transmitted to inform the cellular device 202 that the discovery SMS message(s) were received and/or that its MSISDN was successfully identified. Additionally, and/or alternatively, the discovery engine 420 may transmit one or more response SMS messages requesting the cellular device to resend one or more discovery SMS messages. This may be done, for example, in case the discovery engine 420 fails to identify the MSISDN of the cellular device 202.

As shown at 318, the discovery engine 420 may extract one or more of the ID(s) included in the discovery SMS message(s) received from the cellular device 202.

As shown at 320, the discovery engine 420 may store the ID(s) extracted from the discovery SMS message(s) which uniquely identify the cellular device 202 installed with its SIM. The discovery engine 420 may further store the MSISDN identified for the discovery SMS message(s).

Specifically, the discovery engine 420 may store the ID(s) and the MSISDN of the cellular device 202 associated together, i.e., associated with each other such that the ID(s) of the cellular device 202 maps the MSISDN of the cellular device 202 and vice versa, the MSISDN of the cellular device maps the ID(s) of the cellular device 202.

The discovery engine 420 may store the ID(s) and the MSISDN of the cellular device 202 locally in the discovery system 400, for example, in the storage of the discovery system 400. In another example, the discovery engine 420 may store the ID(s) and the MSISDN in one or more network storage resources accessible via one or more of the networks to which the discovery system 400 is connected through its network interface.

As described in the process 100, the cellular device 202 may be configured support AML and may transmit one or more AML messages to the AML service 210 when detecting one or more emergency calls initiated from the cellular device 202.

As shown at 306, which may occur after the cellular device 202 and the discovery system complete the MSISDN discovery process, the cellular device 202 may identify one or more emergency calls initiated by the cellular device 202 to one or more PSAPs 208, for example, a 911 call in the US, a 112 call in Europe and/or the like.

As shown at 308, when one or more of the emergency calls are initiated from it, the cellular device 202 may transmit one or more AML messages to the AML service 210. The AML message(s) may comprise at least the location (data) of the cellular device 202 and one or more of the ID(s) uniquely identifying the cellular device 202 installed with its SIM. As described herein before, the AML message(s) transmitted by the cellular device 202 may comprise one or more SMS messages, one or more HTTP messages, HTTPS messages and/or the like.

The AML service 210 may extract the ID(s) of the cellular device 202 from the AML message(s) and may communicate with the discovery system 400 to request the MSISDN of the cellular device 202 identified by the ID(s) extracted from the AML message(s). In response, the discovery system 400, specifically the discovery engine 420 may transmit back to the AML service 210 the MSISDN associated by the discovery engine 420 with the ID(s) indicated by (received from) the AML service 210.

In embodiments where the discovery system 400 is integrated with the AML service 210, the AML service 210 executing the e discovery system 400 may have immediate access to retrieve the MSISDN associated with the ID(s) extracted from the AML message(s) received from the cellular device 202.

As described herein before, the PSAP 208 receiving the emergency call(s) initiated by the cellular device 202 may identify the MSISDN for the incoming emergency call(s) and may communicate with the AML service 210 to obtain the location (data) of the cellular device 202. Specifically, the PSAP 208 may issue one or more AML queries with the MSISDN of the cellular device 202 from which the emergency call(s) originates.

In response to the AML query(s), the AML service 210 may transmit back to the PSAP 208 one or more AML response messages which include the location (data) of the cellular device extracted from the AML message(s) received by the AML service 210 from the cellular device 202 and the MSISDN of the cellular device 202 indicated by the PSAP 208 in the AML query(s).

Using the MSISDN, the PSAP 208 may therefore associate incoming emergency calls originating from one or more of the cellular devices 202 with the locations of the cellular devices 202 received from the AML service 210.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms cellular device, SIM, PSAP, and AML message are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of discovering a mobile station international subscriber directory number (MSISDN) of a cellular device, comprising:
    using at least one processor of a cellular device for:
        detecting an activation event of the cellular device with a subscriber identity module (SIM) associated with an MSISDN not exposed to the cellular device;
        transmitting at least one discovery short message service (SMS) message to a discovery system configured to transmit at least one response SMS message to the cellular device in response to receiving the at least one SMS message, the at least one response SMS message comprising the MSISDN identified for the at least one discovery SMS message;
        receiving the at least one response SMS message; and
        storing the MSISDN extracted from the at least one response SMS message;
    wherein the cellular device includes the stored MSISDN and a location of the cellular device in at least one advanced mobile location (AML) message transmitted by the cellular device to an AML service when initiating an emergency call, wherein the activation event is a member of a group consisting of: an initial activation of the cellular device, an initial activation of a new SIM installed in the cellular device, a replacement of the SIM, a periodic MSISDN discovery process scheduled for the cellular device, and an instruction transmitted to the cellular device to initiate an MSISDN discovery process.

2. The method of claim 1, wherein the cellular device is a member of a group consisting of: a cellular phone, a wearable device, and a carry-able device.

3. The method of claim 1, wherein the SIM is a member of a group consisting of: a SIM card and an embedded-SIM (eSIM).

4. The method of claim 1, wherein the at least one discovery SMS message is a member of a group consisting of: a data SMS and a binary SMS.

5. The method of claim 1, wherein the at least one response SMS message is a member of a group consisting of: a data SMS and a binary SMS.

6. The method of claim 1, wherein the MSISDN of the cellular device is identified for the at least one discovery SMS message based on a caller identifier (ID) service.

7. The method of claim 1, wherein the MSISDN of the cellular device is identified for the at least one discovery SMS message based on at least one ID uniquely identifying the cellular device installed with the SIM.

8. The method of claim 7, wherein the at least one ID is a member of a group consisting of: an international mobile equipment identity (IMEI) of the at least one cellular device, an international mobile subscriber identity (IMSI) of the SIM, and an integrated circuit card identifier (ICCID) of the SIM.

9. The method of claim 1, wherein the discovery system is integrated with an AML system executing the AML service.

10. The method of claim 1, wherein the at least one AML message is transmitted via at least one of: an SMS message, and a hypertext transfer protocol secure (HTTPS) based message.

11. The method of claim 1, wherein at least one public safety answering point (PSAP) receiving the emergency call is configured to communicate with the AML service to obtain the location of the cellular device associated with the MSISDN identified for the emergency call by the at least one PSAP.

* * * * *